United States Patent Office 3,437,729
Patented Apr. 8, 1969

3,437,729
TRIS(ARYLAZOARYL)-s-TRIAZINE 2,4,6(1H,3H,5H) TRIONE AND TRITHIONE AS TOXICANTS
John H. Cornell, Jr., Arlington, Mass., assignor to Monsanto Research Corporation, St. Louis, Mo., a corporation of Delaware
No Drawing. Original application Aug. 24, 1965, Ser. No. 482,239, now Patent No. 3,361,735, dated Jan. 2, 1968. Divided and this application Sept. 27, 1967, Ser. No. 679,955
Int. Cl. C07d 55/50; A01n 9/22, 9/14
U.S. Cl. 424—226      3 Claims This is a division of application Ser. No. 482,239, filed Aug. 24, 1965, now U.S. Patent No. 3,361,735.

This invention relates to new s-triazine compounds formed by the trimerization of either arylazoaryl isocyanates or arylazoaryl isothiocyanates.

It is an object of this invention to provide new tris-(arylazoaryl)-s-triazine-2,4,6(1H, 3H, 5H)-triones and trithiones.

It is another object of this invention to provide new compounds useful as biological toxicants.

Still another object of this invention is to provide new compounds useful as mammalian toxicants.

These and other objects will become apparent as a detailed description of the invention proceeds.

According to the invention, there are prepared new and useful compounds having the formula:

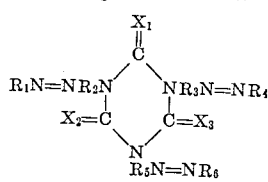

wherein each of $R_1$, $R_2$, $R_3$, $R_4$, $R_5$ and $R_6$ is an aromatic hydrocarbon radical having from 6 to 12 C atoms, and each of $X_1$, $X_2$, and $X_3$ is a chalkogen element selected from the class consisting of oxygen and sulfur.

There are shown below a number of the specific new compounds of the invention. It is not intended that this be a complete listing of all the compounds of the invention, but that it merely be illustrative thereof:

tris(p-phenylazophenyl)-s-triazine-2,4,6(1H, 3H, 5H)-trione,
tris(p-tolylazophenyl)-s-triazine-2,4,6(1H, 3H, 5H)-trithione,
tris(p-benzylazophenyl)-s-triazine-2,4,6(1H, 3H, 5H)-trione,
tris(p-tolylazophenyl)-s-triazine-2,4,6(1H, 3H, 5H)-trithione,
tris(p-tolylazophenyl)-s-triazine-2,4,6(1H, 3H, 5H)-trione,
tris[p-(2,4,6-trimethylphenylazo)phenyl]-s-triazine-2,4,6(1H, 3H, 5H)-trithione,
tris(4-naphthylazophenyl)-s-triazine-2,4,6(1H, 3H, 5H)-trione,
tris[p-(1,3-diethylphenylazo)tolyl]-s-triazine-2,4,6-(1H, 3H, 5H)-trithione,
tris(p-xylylazophenyl)-s-triazine-2,4,6-(1H, 3H, 5H)-trione,
tris(4-naphthylazophenyl)-s-triazine-2,4,6-(1H, 3H, 5H)-trithione,
tris(p-benzylazobenzyl)-s-triazine-2,4,6-(1H, 3H, 5H)-trione,
tris(p-xylylazototyl)-s-triazine-2,4,6-(1H, 3H, 5H)-trithione,
tris(p-tolylazobenzyl)-s-triazine-2,4,6-(1H, 3H, 5H)-trione,
tri(4-biphenylylazophenyl)-s-striazine-2,4,6(1H, 3H, 5H)-trithione,
tris(4-naphthylazobenzyl)-s-triazine-2,4,6-(1H, 3H, 5H)-trione,
tris(4-biphenylylazoxylyl)-s-triazine-2,4,6(1H, 3H, 5H)-trithione,
tris(p-tolylazotolyl)-s-triazine-2,4,6(1H, 3H, 5H)-trione,
tris-(p-xylylazotolyl)-s-triazine-2,4,6(1H, 3H, 5H)-trithione,
tris(4-naphthylazotolyl)-s-triazine-2,4,6(1H, 3H, 5H)-trione,
tris(p-xylylazoxyly)-triazine-2,4,6(1H, 3H, 5H)-trione,
tris(4-naphthylazoxylyl)-s-triazine-2,4,6(1H, 3H, 5H)-trione,
tris(4-naphthylazonaphthyl)-s-triazine-2,4,6(1H, 3H, 5H)-trione,
tris[p-(2-ethylbenzylazo)phenyl]-s-triazine-2,4,6(1H, 3H, 5H)-trione,
tris[p-(2,4-diethylbenzylazo)tolyl]-s-triazine-2,4,6(1H, 3H, 5H)-trione,
tris[p-(3-propylphenylazo)xylyl]-s-triazine-2,4,6(1H, 3H, 5H)-trione,
tris(4-biphenylylazobiphenylyl)-s-triazine-2,4,6(1H, 3H, 5H)-trione, and so forth.

Preparation of the presently provided novel compounds is effected by the trimerization of arylazoaryl isocyanates or arylazoaryl isothiocyanates by heating them in the presence of a basic salt such as potassium acetate, as illustrated by the equation:

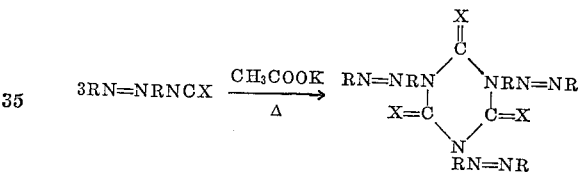

wherein each of R and X is defined above.

In preparing compounds of this invention, useful arylazoaryl compounds which may be used are, for example:

p-phenylazophenyl isocyanate,
p-tolylazophenyl isothiocyanate,
p-benzylazophenyl isocyanate,
p-tolylazobenzyl isothiocyanate,
p-tolylazophenyl isocyanate,
p-(2,4,6-trimethylphenylazo)phenyl isothiocyanate,
4-naphthylazophenyl isocyanate,
p-(1,3-diethylphenylazo)tolyl isothiocyanate,
p-xylylazophenyl isocyanate,
4-naphthylazobenzyl isothiocyanate,
p-benzylazobenzyl isocyanate,
p-xylylazotolyl isothiocyanate,
p-tolylazobenzyl isocyanate,
4-biphenylylazophenyl isothiocyanate,
p-xylylazobenzyl isocyanate,
4-biphenylylazotolyl isothiocyanate,
4-naphthylazobenzyl isocyanate,
4-biphenylylazoxylyl isothiocyanate,
p-tolylazotolyl isocyanate,
p-xylylazobenzyl isocyanate,
4-naphthylazobenzyl isocylanate,
p-xylylazoxylyl isocyanate,
4-naphthylazoxylyl isocyanate,
p-(2-ethylbenzylazo)phenyl isocyanate,
p-(2,4,-diethylbenzylazo)tolyl isocyanate,
p-(3-propylphenylazo)xylyl isocyanate,
4-biphenylylazobiphenylyl isocyanate, and so forth.

The arylazoaryl isocyanates and arylazoaryl isothiocyanates are known compounds which may be prepared by a variety of methods, including the treatment of arylaminoazo compounds with phosgene and thiophosgene, and other methods known to those skilled in the art.

The new compounds of this invention may be prepared by heating the azo compounds in the presence of a suitable alkaline salt such as potassium acetate, sodium propionate, and sodium butyrate, for example. It is an advantage in moderating the reaction to add the catalyst slowly and gradually to the reactant, though the catalyst may be mixed all at once, together with a solvent or diluent if desired.

Solvents or diluents which may be used to moderate the reaction and/or to facilitate stirring the mixture, and so forth, are for example, non-polar solvents, such as benzene, toluene, o-dichlorobenzene, and dimethylformamide.

The molar ratio of the azo compound and alkaline salt catalysts may vary from 1:1 to 100:1 though the preferred ratio is 3:1.

Useful temperatures are, for example, the reflux temperature of the reaction mixture, where low boiling solvents are employed, or from any desired temperature from about ambient temperature to below the decomposition point of the ingredients of the reaction mixture.

Atmospheric pressure is satisfactory for conducting the reaction, though sub- or super-atmospheric pressures may be used if desired, ranging from 0.05 millimeter of mercury to about 5,000 pounds per square inch.

Reaction time may vary; in general, it will depend on the nature of the reactants used and on the temperature of the reaction. Ordinarily reaction time will vary from less than one minute to several hours.

The isolation of the product may be accomplished by any general standard procedure, such as distillation, extraction or crystallization, for example.

The present new compounds are generally stable, well defined products, soluble in alcohols, such as methanol, ethyl alcohol and propyl alcohol, for example.

The presence of the arylazoaryl substituent imparts a biological toxicant property hitherto unknown to this class of compounds, as demonstrated by testing known tris-(aryl)-s-triazine-2,4,6(1H, 3H, 5H)-triones under the same conditions as the compounds described in this invention.

The new compounds are useful for a variety of industrial and agricultural uses; for example, the tris(p-phenylazophenyl) - s - triazine - 2,4,6(1H, 3H, 5H) - trione may be used as a biological toxicant, and is particularly effective as a mammalian toxicant, as well as possessing utility as a defoliant and herbicide.

The invention will be further described with reference to the following specific examples. These examples are given for purposes of illustration only and are not to be taken as in any way restricting the invention.

Example 1

This example illustrates the preparation of compounds in accordance with this invention.

To a reaction flask containing 1 gram (g.) (0.015 moles) of sodium acetate (anhydrous) in 25 milliliters (ml.) of dimethylformamide, is added a solution consisting of 100 g. (0.45 mole) of p-phenylazophenyl isocyanate dissolved in 125 ml. of dimethylformamide. The temperature of the reaction mixture is maintained in the range of 30° to 60° C. during addition. Following addition of the isocyanate, the reaction mixture is cooled to 10° C. and filtered; the solid product thus obtained is washed several times with dry ether and allowed to dry at ambient temperature for a period of 12 hours.

The resultant solid is tris(p-phenylazophenyl)-s-triazine-2,4,6(1H, 3H, 5H)-trione, a uniformly yellowish-orange crystalline product weighing 281 g. (42% theoretical yield), soluble in ethyl alcohol and melting at >300° C.

Elemental analysis of this product confirms the empirical formula $C_{39}H_{27}N_9O_3$.

Calculated, percent: C, 69.8; H, 4.1; N, 18.8. Found, percent: C, 70.1; H, 4.2; N, 18.9.

Example 2

This example illustrates the use of a compound of the present invention as a mammalian toxicant.

The s-triazine compound provided as described in Example 1 is placed in solution by dissolving 100 milligrams (mg.) of the compound in 10 ml. of an aqueous solution containing 20% of a polyethylene glycol having a molecular weight of 300. This solution is diluted with water to provide solutions of varying concentration which are injected into mice intravenously. At 100 milligrams per kilogram (mg./kg.) body weight (10 ml./kg.), the test animals are killed; at 32 mg./kg. (3.2 ml./kg.), the mice exhibit dyspnea. The ratio of median lethal dose to median effective dose ($LD_{50}/MED_{50}$) is 3.2.

By contrast, similar administration of tris(p-bromophenyl)-s-triazine-2,4,6(1H, 3H, 5H)-trione a known related compound, at the higher rate of 100 mg./kg. produces only dyspnea while at the lower rate of 32 mg./kg. no effect is produced on the test animals.

The p-bromophenyl compound, a stable crystalline solid melting at >300° C., is prepared by heating p-bromophenyl isocyanate in the presence of sodium acetate, using a method similar to that used to make the tris(p-phenylazophenyl)-s-triazine-2,4,6(1H, 3H, 5H)-trione.

The new compounds of this invention are generally applied for herbicidal and toxicant use in the form of sprays or aerosols. Useful sprays may be prepared by dispersing the present products in water with the aid of a wetting agent, to prepare aqueous dispersion which may be employed as by sprays. For example, a cyclohexanone solution of a polyalkylene glycol ether long chain alkylbenzene sulfonate emulsifier may be used to prepare such dispersion or emulsions. The products may also be applied to plants as oil-in-water emulsion sprays. The present products may also be dispersed or dissolved in liquified gases such as fluorochloroethanes or methyl chloride and applied to plants from aerosol bombs. Instead of employing liquids as carriers and diluents, herbicidal dusts which contain the present novel compounds as active ingredients may be prepared, for example, by incorporating the new products of this invention with a solid carrier such as talc, bentonite, fuller's earth, and so forth.

The amount of herbicidally active compounds in the composition as applied will vary with the active ingredients, the manner of application, the species to be destroyed and the resistance of the plants to be sprayed, for example, the formulation and ratio of applications are suitably adjusted in accordance with these factors.

It is apparent that this invention may be extended to areas beyond those specifically described and that many widely differing embodiments can be made without departing from the spirit and scope thereof as defined herein.

What is claimed is:

1. A method of poisoning an animal which comprises administering to said animal a toxic amount of a composition containing an active ingredient of the formula:

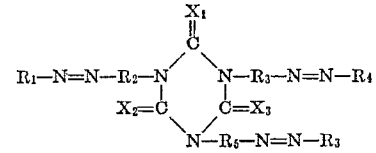

wherein each of $R_1$, $R_2$, $R_3$, $R_4$, $R_5$ and $R_6$ is an aromatic hydrocarbon radical of from 6 to 12 C atoms, and each of $X_1$, $X_2$ and $X_3$ is a chalkogen element selected from the class consisting of oxygen and sulfur.

2. The method of claim 1 in which said composition contains an inert carrier.

3. The method of claim 1 in which said composition contains an inert carrier and a dispersing agent.

References Cited

UNITED STATES PATENTS

| | | | |
|---|---|---|---|
| 3,230,221 | 1/1966 | Kaveggia et al. | 260—153 |
| 3,230,222 | 1/1966 | Kaveggia et al. | 260—153 |
| 3,361,735 | 1/1968 | Cornell | 167—46 |

ALBERT T. MYERS, *Primary Examiner.*

J. GOLDBERG, *Assistant Examiner.*

U.S. Cl. X.R.

71—93

PO-1050
(5/69)

UNITED STATES PATENT OFFICE
CERTIFICATE OF CORRECTION

Patent No. 3,437,729     Dated April 8, 1969

Inventor(s) John H. Cornell, Jr.

It is certified that error appears in the above-identified patent and that said Letters Patent are hereby corrected as shown below:

Column 4, claim 1, line 68, change "$R_3$" to --- $R_6$ ---.

Signed and sealed this 12th day of June 1973.

(SEAL)
Attest:

EDWARD M. FLETCHER, JR.
Attesting Officer

ROBERT GOTTSCHALK
Commissioner of Patents